(12) United States Patent
Kano et al.

(10) Patent No.: US 8,565,543 B2
(45) Date of Patent: Oct. 22, 2013

(54) VIDEO RECORDING APPARATUS, VIDEO RECORDING METHOD, AND RECORDING MEDIUM

(75) Inventors: Shinya Kano, Kanagawa (JP); Shunji Okada, Kanagawa (JP)

(73) Assignee: Sony Corporation, Tokyo (JP)

( * ) Notice: Subject to any disclaimer, the term of this patent is extended or adjusted under 35 U.S.C. 154(b) by 939 days.

(21) Appl. No.: 12/498,644

(22) Filed: Jul. 7, 2009

(65) Prior Publication Data

US 2010/0014841 A1  Jan. 21, 2010

(30) Foreign Application Priority Data

Jul. 18, 2008  (JP) .................................. 2008-186764

(51) Int. Cl.
*G06K 9/36*  (2006.01)
(52) U.S. Cl.
USPC .......................................... 382/235; 345/621
(58) Field of Classification Search
USPC .......................................... 382/235; 345/621
See application file for complete search history.

(56) References Cited

U.S. PATENT DOCUMENTS

| | | | |
|---|---|---|---|
| 6,490,370 B1* | 12/2002 | Krasinski et al. ............. | 382/195 |
| 2006/0072797 A1* | 4/2006 | Weiner et al. ................. | 382/128 |
| 2006/0115235 A1 | 6/2006 | Takikawa et al. | |
| 2008/0129844 A1 | 6/2008 | Cusack et al. | |
| 2008/0181505 A1* | 7/2008 | Wu et al. ....................... | 382/190 |
| 2009/0059017 A1* | 3/2009 | Kurokawa ................... | 348/208.1 |
| 2009/0179998 A1* | 7/2009 | Steinberg et al. .......... | 348/222.1 |
| 2009/0226069 A1* | 9/2009 | Razzaque et al. ............. | 382/131 |
| 2010/0201688 A1* | 8/2010 | Mori et al. .................... | 345/428 |
| 2010/0208069 A1* | 8/2010 | Rezvani et al. ............... | 348/143 |

FOREIGN PATENT DOCUMENTS

| | | |
|---|---|---|
| JP | 2003-219396 | 7/2003 |
| JP | 2005-269563 A | 9/2005 |
| JP | 2006-109119 | 4/2006 |
| JP | 2007-295183 A | 11/2007 |
| WO | WO 2008/057285 A2 | 5/2008 |

OTHER PUBLICATIONS

Chinese Office Action issued on Sep. 7, 2010, in Patent Application No. 200910160730.7 (with English translation).
Office Action issued Dec. 4, 2012, in Japanese Patent Application No. 2008-186764 filed Jul. 18, 2008.
Office Action issued Jun. 19, 2012, in Japanese Patent Application No. 2008-186764.

* cited by examiner

*Primary Examiner* — Jingge Wu
(74) *Attorney, Agent, or Firm* — Oblon, Spivak, McClelland, Maier & Neustadt, L.L.P.

(57) ABSTRACT

A video recording apparatus optimally records partial images made up of a partial area from an original image and containing a feature point such as person's face. An imaging unit acquires the original image by imaging at a resolution higher than the pixel count used for video recording. A feature point detector detects one or more feature points from the original image. A partial image clipper clips, from the original image, a partial image containing a feature point selected by the user. An encoder encodes the clipped partial image. A recording unit then records the encoded partial image to a recording medium. In so doing, the user is able to select a recording subject from a summary of detected feature points before or during video recording, and thus record a desired face.

7 Claims, 13 Drawing Sheets

VIDEO RECORDING APPARATUS, VIDEO RECORDING METHOD, AND RECORDING MEDIUM

BACKGROUND OF THE INVENTION

1. Field of the Invention

The present invention relates to a video recording apparatus that records video such as footage acquired by a digital video camera, as well as to a video recording method, and a recording medium. More particularly, the present invention relates to a video recording apparatus, a video recording method, and a recording medium whereby acquired footage or other video is recorded using image recognition technology, such as face detection and facial recognition.

More specifically, the present invention relates to a video recording apparatus, a video recording method, and a recording medium whereby partial images made up of a partial area containing a feature point such as a person's face are recorded from original images that were acquired at a resolution higher than the pixel count used for video recording. More particularly, the present invention relates to a video recording apparatus, a video recording method, and a recording medium whereby partial images containing a feature point desired by the user are recorded from original images containing a plurality of such feature points.

2. Description of the Related Art

Digital cameras have come into widespread use. Digital cameras digitize images captured by a solid-state imaging sensor such as a CCD (charge-coupled device) or CMOS (complementary metal-oxide semiconductor). By means of such digital cameras, digitally encoded images can be stored in memory and then be processed or managed on a computer, without the problems related to film life. When a hard disk is included in the recording component of a digital video camera, it is possible to digitally record large amounts of high-quality image data, and later randomly access recorded data. Furthermore, such a digital video camera can be connected to a computer to enable file operations and image or video editing on the computer.

Technology for automating camera work has been introduced into digital cameras. For example, there exist functions for auto focus (AF), auto exposure (AE), image stabilization, and auto shutter. Processing such as that for AF and AE have the advantage of being realized by means of digital processing, rather than by camera optics. In addition, by using digital processing to perform image quality adjustments with respect to acquired footage, a suitable color state can be reproduced. For example, auto white balance (AWB) may be used to apply white balance gain to acquired footage.

Furthermore, image recognition engines have recently come to be incorporated into digital cameras. By means of such image recognition engines, areas containing feature points can be specified within the acquired footage. The feature points referred to herein can take on various meanings, but principally refer to human faces. The introduction of facial recognition technology into digital cameras is founded upon the large number of cases wherein people, and particularly their faces, wholly constitute the photographic subject. Image recognition can thus lead to the development of technology for improving the image quality of the portions of images containing people and their faces. For example, on the basis of facial recognition results, the focus may be automatically matched to a face, or alternatively, the image quality may be automatically corrected to match the face.

In digital cameras, it is typical to acquire images at a resolution higher than the pixel count used for video recording. Utilizing the above, it is possible to detect the area containing faces or people within an image, and subsequently perform high quality partial encoding or partial enlargement and encoding of the detected area. In so doing, faces can be recorded sharply and distinctly (see Japanese Unexamined Patent Application Publication No. 2003-219396, for example).

In addition, a video recording apparatus has been proposed having the following: imaging means for imaging at a resolution higher than the pixel count used for video recording; full image generating means for resolution-converting the original image obtained by imaging into a full image having the pixel count used for video recording; partial image generating means for generating an image having the pixel count used for video recording from a portion of the original image; and recording means for recording, in association with each other, a full video made up of full images, and a partial video made up of partial images (see Japanese Unexamined Patent Application Publication No. 2006-109119, for example). According to the above video recording apparatus, by simply acquiring footage with the overall state contained in the field of view, both overall and partial (i.e., zoomed-in) videos are automatically recorded. For this reason, acquiring and recording footage can be simplified, without zooming or similar operations being performed by the camera operator. Furthermore, facial recognition technology may be used to generate partial images containing faces of large size appearing in the original images, or to generate partial images when a face detected from the full image matches a face that has been registered in advance. In so doing, it is possible to record only partial videos of desired persons (i.e., registrants), even when a large number of people appear within the field of view.

However, if the above video recording apparatus relies on a selection method involving the size order of faces in the original image or using registered faces as feature points, then certain problems develop when attempting to implement the apparatus as a consumer video camera or similar product.

For example, in some cases the user may not have decided on the photographic subject in advance, and thus there is a problem in that the face that the user wants to record may not be registered. Furthermore, in cases such as when a large number of people are lined up at equal distances to the camera, the sizes of their respective faces become nearly uniform, and thus there is no guarantee that the user will be able to record the particular desired face.

SUMMARY OF THE INVENTION

The present invention provides an excellent video recording apparatus, video recording method, and recording medium whereby acquired footage or other video is optimally recorded using image recognition technology, such as face detection and facial recognition.

Furthermore, the present invention provides an excellent video recording apparatus, video recording method, and recording medium whereby partial images made up of a partial area containing a feature point such as a person's face are optimally recorded from original images that were acquired at a resolution higher than the pixel count used for video recording.

Moreover, the present invention also provides an excellent video recording apparatus, video recording method, and recording medium whereby partial images containing a feature point desired by the user are optimally recorded from original images containing a plurality of such feature points.

A video recording apparatus in accordance with a first embodiment of the present invention is provided with: an imaging unit configured to acquire an original image by imaging at a resolution higher than the pixel count used for video recording; a feature point detector configured to detect one or more feature points from the original image acquired by imaging; a partial image clipper configured to clip, from the original image, a partial image containing a feature point selected by the user; an encoder configured to encode the partial image clipped by the partial image clipper; and a recording unit configured to record the encoded partial images to a recording medium.

According to the video recording apparatus in accordance with the first embodiment of the present invention, a partial image containing a feature point is clipped according to a feature point selection operation or a selection switching operation from the user. The clipped partial image is then encoded and recorded to a recording medium. In other words, it is possible for the user to select a subject for recording from among detected feature points before or during video recording, thereby enabling the user to record a desired face.

According to a video recording apparatus in accordance with a second embodiment of the present invention, the partial image clipper determines clipping areas such that the position of the feature point is nearly uniform over a plurality of partial images.

According to a video recording apparatus in accordance with a third embodiment of the present invention, a summary of the one or more feature points detected from the original image is presented to the user. A partial image containing a feature point is then clipped according to a feature point selection operation or a selection switching operation from the user. The clipped partial image is then encoded and recorded to a recording medium. In other words, before or during video recording, it is possible for the user to select a subject for recording from among detected feature point candidates displayed in a summary view, thereby enabling the user to record a desired face.

A video recording apparatus in accordance with a fourth embodiment of the present invention is additionally provided with a feature point changer configured to change the feature point to be clipped as a partial image. For this reason, the feature points used for video recording can be switched.

In a video recording apparatus in accordance with a fifth embodiment of the present invention, the encoder encodes in encoding units having a predetermined number of pictures. At a given time, the feature point to be clipped as a partial image may be switched from a first feature point to a second feature point by the feature point changer. At the time of such switching, if the encoder is in the process of encoding an encoding unit for the partial images related to the first feature point, then the encoder first finishes encoding the current encoding unit, and subsequently resumes video recording for the partial images related to the second feature point (in other words, the clipping of partial images related to the second feature point performed by the partial image clipper, the encoding processing performed by the encoder, and the recording processing performing by the recording unit). Consequently, video recording can be momentarily paused and then resumed for the changed feature point, without the user editing the video after recording.

In a video recording apparatus in accordance with a sixth embodiment of the present invention, the encoder encodes in encoding units having a predetermined number of pictures. When the feature point to be clipped as a partial image is switched from a first feature point to a second feature point by the feature point changer, partial images related to the second feature point are buffered until the encoder finishes encoding the encoding unit that was in progress at the time of the switching. Once the encoding of the current encoding unit is finished, encoding is commenced for the buffered partial images related to the second feature point. In such cases, when the feature point used for video recording is switched, video recording of the changed feature point can be resumed as a new chapter or file, without pausing the video recording, and furthermore without editing the video after recording.

A video recording method in accordance with a seventh embodiment of the present invention includes the steps of: acquiring an original image imaged at a resolution higher than the pixel count used for video recording; detecting one or more feature points from the original image; clipping, from the original image, a partial image containing a feature point selected by the user; encoding the partial image clipped in the partial image clipping step; and recording the encoded partial image to a recording medium.

A recording medium in accordance with an eighth embodiment of the present invention stores a computer program in a computer-readable format, such that processing for recording video is executed on a computer. The computer program causes the computer to act as: original image acquiring means for acquiring an original image imaged at a resolution higher than the pixel count used for video recording; feature point detecting means for detecting one or more feature points from the original image acquired by imaging; partial image clipping means for clipping, from the original image, a partial image containing a feature point selected by the user; image encoding means for encoding the partial image clipped by the partial image clipping means; and recording means for recording the encoded partial image to a recording medium.

The computer program stored in the recording medium in accordance with the eighth embodiment of the present invention may also be defined as a computer program in a computer-readable format such that predetermined processing is realized on the computer. Stated differently, the computer program stored on the recording medium in accordance with the eighth embodiment of the present invention may be installed onto the computer, whereby cooperative action is exhibited on the computer, and whereby advantages are obtained similar to those of the video recording apparatus in accordance with the first embodiment of the present invention.

According to embodiments of the present invention, an excellent video recording apparatus, video recording method, and recording medium are provided, whereby acquired footage or other video is optimally recorded using image recognition technology such as face detection and facial recognition.

In addition, according to embodiments of the present invention, an excellent video recording apparatus, video recording method, and recording medium are provided, whereby partial images made up of a partial area containing a feature point such as a person's face are optimally recorded from original images that were acquired at a resolution higher than the pixel count used for video recording.

Moreover, according to embodiments of the present invention, an excellent video recording apparatus, video recording method, and recording medium are provided, whereby partial images containing a feature point desired by the user are optimally recorded from original images containing a plurality of such feature points.

According to the first, seventh, and eighth embodiments of the present invention, it is possible for the user to select a subject for recording from a summary of detected feature points before or during recording, thereby enabling the user to record a desired face.

According to the second embodiment of the present invention, a partial image clipper determines clipping areas such that the position of the feature point is nearly uniform over a plurality of partial images.

According to the third embodiment of the present invention, it is possible for the user to select, before or during video recording, a subject for recording from among detected feature point candidates displayed in a summary view, thereby enabling the user to record a desired face.

According to the fourth embodiment of the present invention, the person used for video recording can be switched while shooting. In other words, the person set as the tracking target can be changed during video recording.

According to the fifth embodiment of the present invention, when the feature point used for video recording is changed, video recording can be momentarily paused and then resumed for the changed feature point, without editing the video after recording.

According to the sixth embodiment of the present invention, when the feature point used for video recording is changed, video recording of the changed feature point can be resumed as a new chapter or file, without pausing the video recording, and without editing the video after recording.

Further features and advantages of the present invention will become apparent upon reading of the following detailed description of exemplary embodiments in conjunction with the attached drawings.

DESCRIPTION OF THE PREFERRED EMBODIMENTS

Hereinafter, embodiments of the present invention will be described in detail and with reference to the accompanying drawings.

Figure 1:
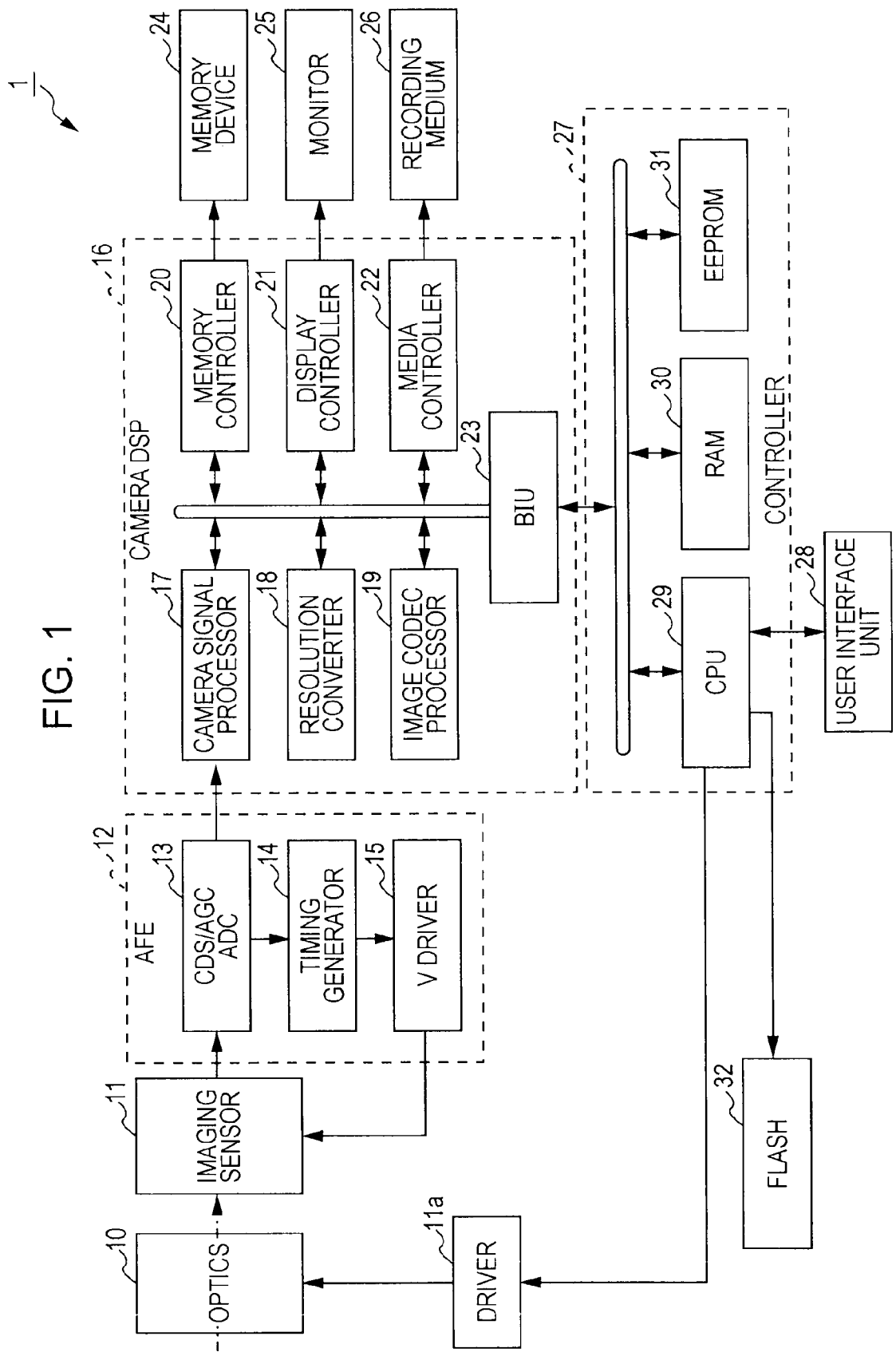
FIG. 1 schematically illustrates the configuration of a digital video camera exemplifying an apparatus able to operate as a video recording apparatus to which an embodiment of the present invention has been applied.

FIG. 1 schematically illustrates the configuration of a digital video camera exemplifying an apparatus able to operate as a video recording apparatus to which an embodiment of the present invention has been applied. The digital video camera 1 shown in FIG. 1 includes an imaging sensor 11, an analog front end (AFE) 12, and a camera digital signal processor (DSP) 16, and is configured to digitally process and record images input via optics 10.

The optics 10 include a lens for collecting light from a photographic subject onto the imaging surface of the imaging sensor 11, a driving mechanism for focusing and zooming images by moving the lens, a shutter mechanism that uses opening and closing operations to cause light from the subject to be incident on the imaging sensor 11 for set amounts of time, and an iris (i.e., diaphragm) mechanism that limits the direction and range of the light beam from the subject. (None of the above are shown in the drawings). On the basis of a control signal from a CPU 29 later described, a driver 10a controls the driving of the respective mechanisms within the optics 10 (for subject focusing and iris control, for example).

The imaging sensor 11 includes an imaging surface whereupon a two-dimensional CCD or CMOS array of pixels having photoelectric conversion properties is disposed. The imaging surface converts incident light from the subject into an electrical signal. On the light-receiving side, a GRBG coding monopanel is disposed, for example. A signal charge corresponding to the amount of light incident through each color filter accumulates in each pixel. The color of light incident at that pixel position can then be reproduced from the magnitude of the respective signal charges for each of the three colors read from each pixel. Although the analog image signal output from the imaging sensor 11 herein is a primary color signal made up of the respective colors R, G, and B, complementary color signals may also be used.

The AFE 12 includes a CDS/AGC/ADC block 13, a timing generator 14, and a V driver 15, and may be configured as a single integrated circuit (IC) chip, for example.

In the CDS/AGC/ADC block 13, low noise in the pixel signals received from the imaging sensor 11 is suppressed with high accuracy. Subsequently, the signals pass through a sample and hold circuit using correlated double sampling (CDS), and in addition, a suitable gain control is applied by an automatic gain control (AGC) circuit. AD conversion is then performed, and a digital image signal is output.

The timing generator 14 generates a timing pulse signal for driving the imaging sensor 11. Operating in accordance with the timing pulse, the V driver 15 then outputs a driving signal for outputting charges for each pixel in the imaging sensor 11 on a line-by-line basis in the vertical direction.

The camera digital signal processor (DSP) 16 includes a camera signal processor 17, a resolution converter 18, an image codec processor 19, a memory controller 20, a display controller 21, and a media controller 22, and may be configured as a single IC chip, for example.

The camera signal processor 17 subjects the image signal sent from the AFE 12 to various pre-processing, such as defective pixel correction, digital clamp control, and digital gain control. Subsequently, white balance gain is applied by AWB, while image quality correction processing such as sharpness and further contrast adjustments are also performed to reproduce the correct color state. (The image quality adjustments may also include processing such as flash metering and red-eye reduction.) Additionally, demosaicing processing is used to generate an RGB picture signal. The camera signal processor 17 then performs gamma correction with respect to the RGB image signal, thereby converting the image information into tones suitable for monitor output, printing, or image recording.

The resolution converter 18 modifies the size of an acquired image according to whether the image is to be output as a through-the-lens image displayed on a monitor display 25, or alternatively, saved to the recording medium 26 as a still image or part of a video.

The image codec processor 19 converts an image signal expressed in the RGB color system into an image signal made up of luma (Y) and chroma (Cr/Cb) signals. The image codec processor 19 then encodes and compresses the image signal using a compression scheme such as MPEG (Moving Pictures Experts Group) or JPEG (Joint Photographic Experts Group). Conversion into YUV color space allows for easier data compression by taking advantage of the characteristics of human perception, which exhibit high resolution with respect to luminance and low resolution with respect to color.

Figure 2:
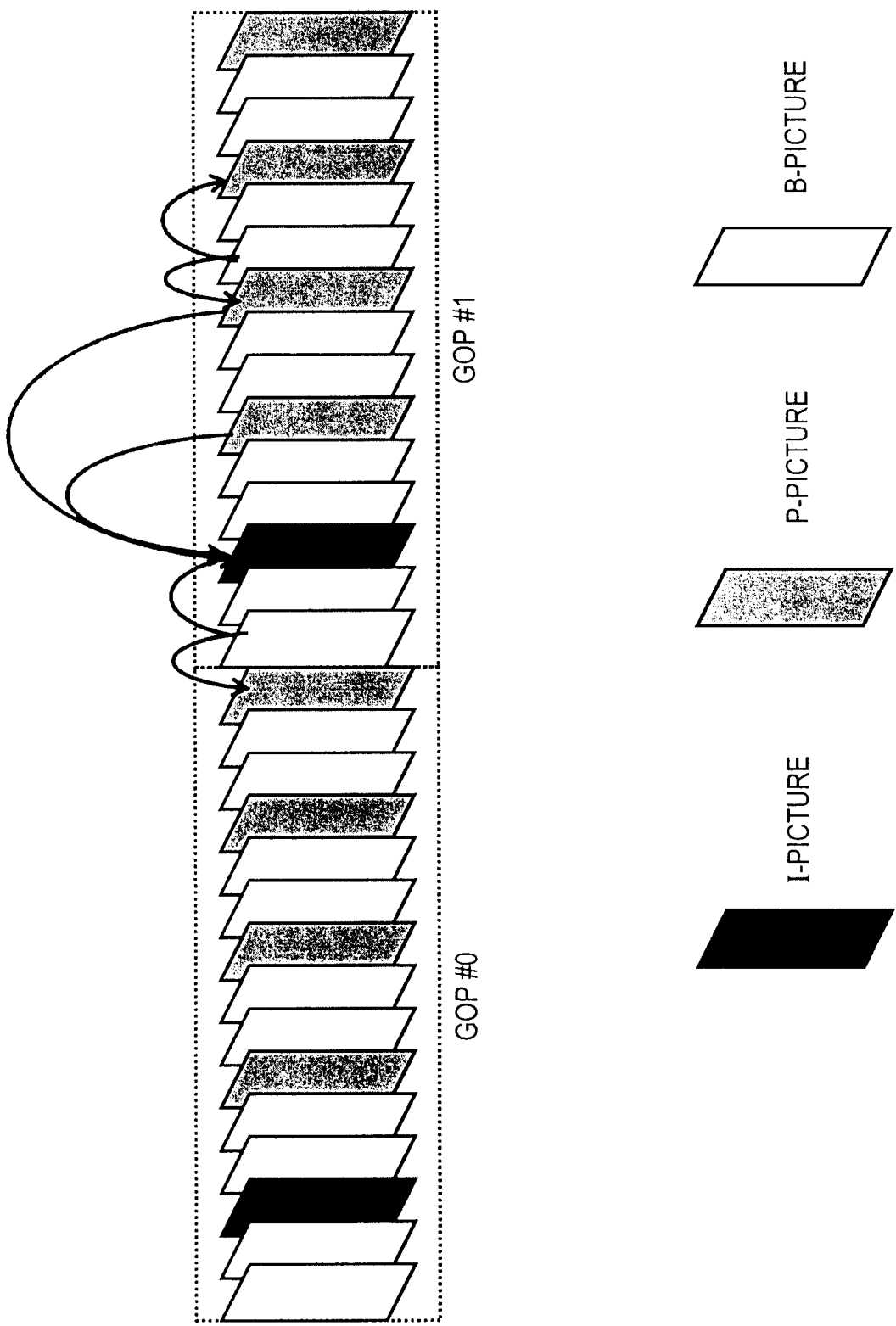
FIG. 2 schematically illustrates the GOP structure in MPEG encoding methods.

In MPEG encoding methods, a GOP (group of pictures) structure is implemented, wherein groups of several pictures are treated as single units. Within each GOP, different picture types are arranged according to certain rules (see FIG. 2). The picture types are: intra coded I/IDR pictures, predictive coded P pictures, and bidirectionally predictive coded B pictures. It is then possible to randomly access a video stream by accessing a particular GOP.

The memory controller 20 controls access operations for reading or writing data, such as acquired image information, to a memory device 24 used as a frame buffer.

The media controller 22 reads or writes data to the recording medium 26. More specifically, the media controller 22 plays back and records video data or still image data. The recording medium 26 referred to herein is a high-capacity recording device such as a hard disk, for example, with the media controller 22 and the recording medium 26 together forming a hard disk drive as a single unit. As another example, the recording medium 26 may also be a replaceable recording medium such as a DVD (Digital Versatile Disc). In this case, the media controller 22 corresponds to a DVD drive. As yet another example, the recording medium 26 may be a removable recording medium such as a Memory Stick™. In this case, the media controller 22 is taken to include a slot into which the recording medium 26 can be inserted.

Figure 3:
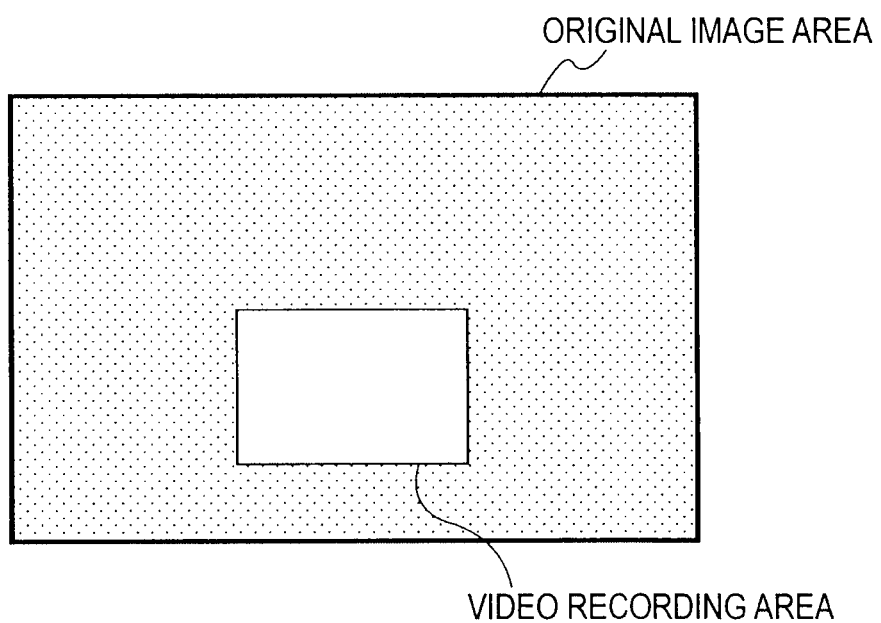
FIG. 3 is a diagram for explaining how the acquired image input from an AFE 12 to a camera DSP 16 has a resolution higher than the video recording pixel count of videos encoded by the camera DSP 16 and recorded to a recording medium 26.

An acquired image input from the AFE 12 into the camera DSP 16 is encoded by the camera DSP 16 and recorded to the recording medium 26 at a resolution higher than the pixel count used for video recording (see FIG. 3). Hereinafter, an acquired image having a resolution higher than the pixel count used for video recording will be referred to as an "original image". In addition, the present embodiment is provided with functions for recording, from an original image, an area containing a feature point such as a person's face. Such an area is herein recorded as a "partial image". Further details will be given hereinafter.

The monitor display 25 is, for example, an LCD (liquid crystal display) or other type of thin display panel. The display controller 21 controls the driving of the monitor display 25, such that image data output from the camera signal processor 17 (i.e., a through-the-lens image) or image data saved in the memory device 24 is first converted into a signal for display on the monitor display 25, and subsequently output to the monitor display 25.

In addition to through-the-lens images, an OSD (on-screen display) is also output and displayed on the monitor display 25 in response to requests from the controller 27, to be later described. The OSD combines menu screens and various configuration screens with a variety of warnings and other information. The through-the-lens image referred to herein is, for example, an original image having a resolution higher than the pixel count used for video recording. However, a partial image may also be displayed.

In addition, a touch sensor is also laid over the surface of the monitor display 25, such that the monitor display 25 also functions as a touch panel. The coordinates recognized by the touch panel and the coordinates displayed on the display panel are identical. Consequently, the user is able to directly specify thumbnail images or other elements displayed on a GUI (graphical user interface) screen.

Image recognition technology is also incorporated into the digital video camera 1, such that feature points such as people's faces contained in an acquired original image can be detected (to be later described). Feature points are then displayed on the monitor display 25 in a summary view, thereby enabling the user to select, via the above touch panel, a person he or she wants to record as a partial image. Further details will be given hereinafter.

The camera DSP 16 is connected to the controller 27 via a bus interface unit (BIU) 23. The controller 27 includes components such as a UI (user interface) unit 28, a CPU (central processing unit) 29, RAM 30 acting as the primary storage memory for the CPU 29, and EEPROM (electrically erasable and programmable ROM) 31 that stores data such as program code and device information in a non-volatile manner. In addition, the UI unit 28 is provided with user-operable functions enabling the user to issue command input, as well as output functions such as one or more speakers and LED lamps.

The CPU 29 executes general control of the overall operation of the apparatus according to user operations, while additionally executing image recognition and other processing. Alternatively, in addition to the CPU 29, the controller 27 may also be configured to include a dedicated image recognition engine (not shown in the drawings).

The digital video camera 1 includes a video recording mode and a still image mode, wherein image or video data obtained by acquiring images is saved to the recording medium 26. The commands issued by a shutter key operation differ depending on the recording mode. The digital video camera 1 also includes other modes besides the above recording modes, such as a playback mode wherein data that has been recorded onto the recording medium 26 is played back on the monitor display 25.

In the digital video camera 1, a signal obtained by photoelectric conversion of light received by the imaging sensor 11 is first supplied to the AFE 12, subjected to CDS and AFE processing, and subsequently converted into a digital signal. The camera signal processor 17 then performs image quality correction with respect to the digital image signal supplied from the AFE 12, and finally, the digital image signal is converted into luma (Y) and color-difference (R-Y, B-Y) signals before being output. Subsequently, the image data output from the camera signal processor 17 is converted into an image signal for display by the display controller 21, and a through-the-lens image is then displayed on the monitor display 25.

The digital video camera 1 acquires images at a resolution higher than the pixel count used for video recording (as described earlier and illustrated in FIG. 3). For example, by operating in conjunction with image recognition technology, the digital video camera 1 is able to clip, from original images, partial images featuring a specific feature point such as a person's face that was detected in the original images. In so doing, a partial (i.e., zoomed-in) video can be recorded, without the camera operator performing zoom operations. Thus, the shooting and recording of video can be simplified in such cases.

Herein, the person's face to be detected as a feature point may be a registered face, or a face of large size contained in the original image may be automatically selected. However, there is a problem in such cases, in that there is no guarantee that the user's desired face will be recorded. Consequently, the present embodiment is configured such that a summary of one or more feature points detected from the original image is presented to the user. Partial images containing a particular feature point are then clipped from original images according to a feature point selection operation or a selection switching operation by the user. Recording processing to encode and record the clipped partial images is then executed. In so doing, it becomes possible for the user to select a subject for recording from a summary of detected feature points before or during video recording, thereby enabling the user to record a desired face.

Figure 4:
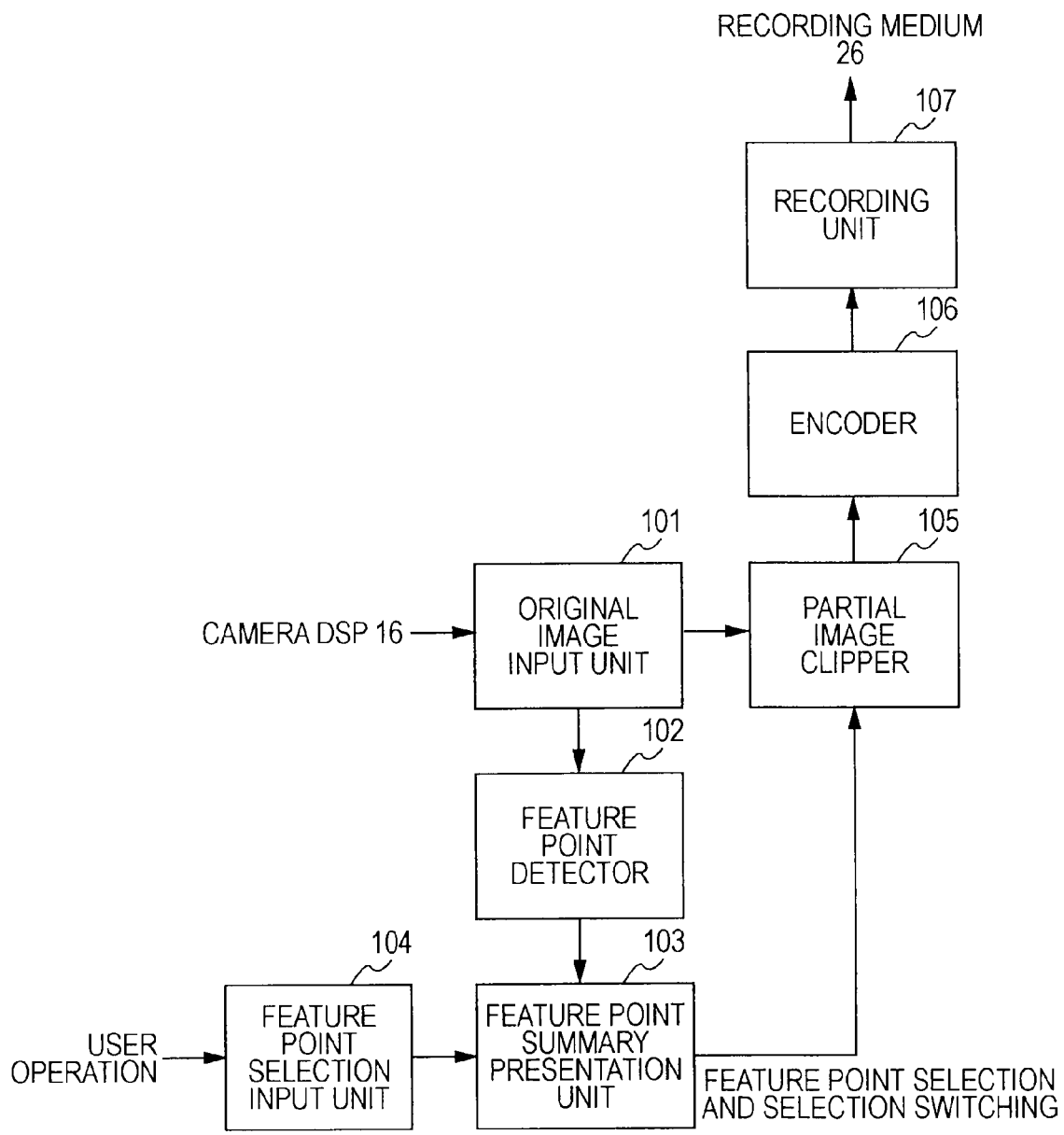
FIG. 4 schematically illustrates a functional configuration for encoding and recording a partial image specified within an original image by the user.

FIG. 4 schematically illustrates an exemplary functional configuration for encoding and recording a partial image specified within an original image by the user in the digital video camera 1. In practice, such functions are realized as a result of the CPU 29 working cooperatively with other circuit modules. In the example shown in FIG. 4, such functions are realized by an original image input unit 101, a feature point detector 102, a feature point summary presentation unit 103, a feature point selection input unit 104, a partial image clipper 105, an encoder 106, and a recording unit 107.

The original image input unit 101 inputs, from the AFE 12, an original image having a resolution higher than the pixel count used for video recording.

The feature point detector 102 uses an image recognition engine (described earlier) to detect one or more feature points contained in an original image obtained by imaging. A person's face is a representative example of the feature points referred to herein. A facial recognition system may, for example, include the following processes: a face detection process that detects the positions of face images and then extracts such images as detected faces; a face parts detection process that detects the positions of the principal parts of the detected faces; and a face discrimination process that discriminates among the detected faces (i.e., identifies persons). In the face detection process, the sizes and positions of faces are detected from the input image, with the results extracted as detected faces. In the face parts detection process, face parts are discovered from the detected faces, such as the eye centers, the inner eye corners, the outer eye corners, the nose, and the eyebrows. Subsequently, after performing positional alignment and rotational correction on the basis of the detected positions of the face parts in the detected faces, discrimination among the detected faces (such as the recognition of persons) is conducted in the face discrimination process. For details regarding such facial recognition processes, see for example Japanese Patent Application No. 2007-317730, previously granted to the present applicants.

The feature point summary presentation unit 103 and the feature point selection input unit 104 are realized by the monitor display 25 stacked with a touch panel, which displays a screen showing a summary of the feature points detected by the feature point detector. Subsequently, the user directly selects, on the summary display screen, a feature point for which the user desires to record a partial (i.e., zoomed-in) video. The user is furthermore able to perform a selection switching operation after having made an initial selection.

Figure 5:
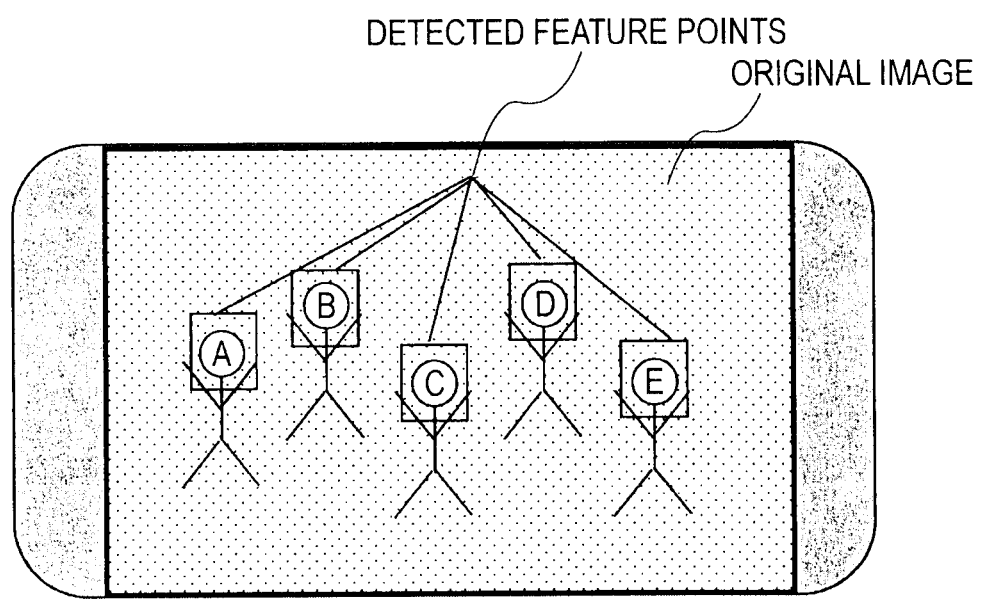
FIG. 5 illustrates the state displayed in summary view overlaying the through-the-lens-image by a feature point summary presentation unit 103, in the case where people's faces are used as feature points.

FIG. 5 illustrates the state displayed in summary view overlaying the through-the-lens-image by the feature point summary presentation unit 103, in the case where people's faces are used as feature points. In the example shown in FIG. 5, the detected faces for a total of five persons A to E are detected as feature points. In addition, the areas surrounding each face are made into buttons for selecting clippable partial images. The user (i.e., the camera operator) is then able to select a partial image by touching one of the buttons.

Figure 6:
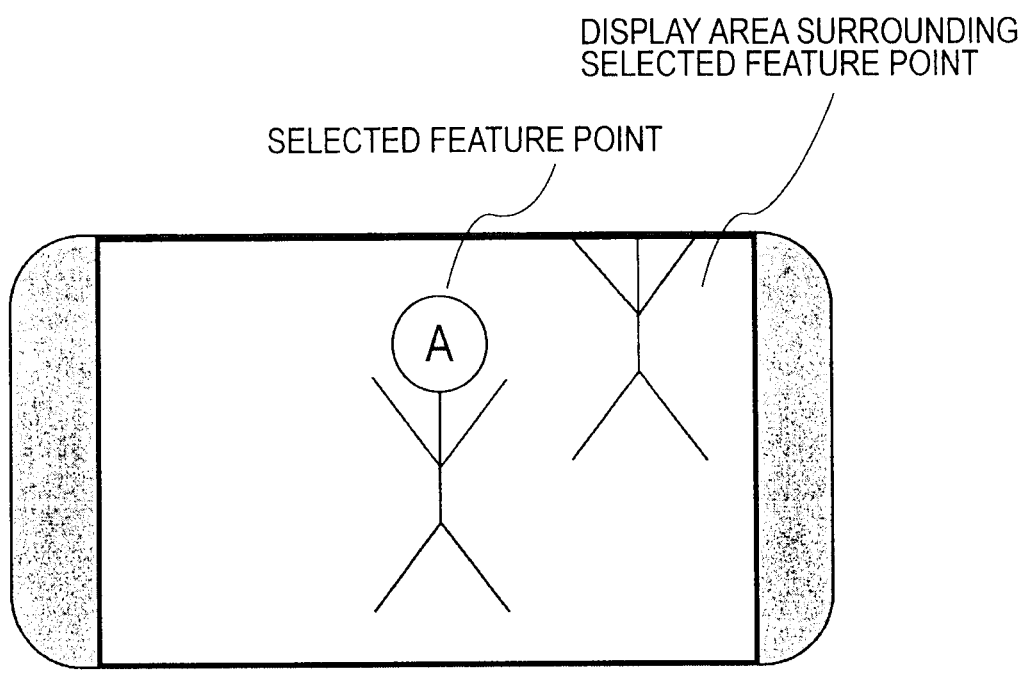
FIG. 6 illustrates an example of a partial image in the case where a person A is selected from the summary screen shown in FIG. 5 by a feature point selection input unit 104.

The partial image clipper 105 clips, from the original image, a partial image containing the feature point selected by the user. FIG. 6 illustrates an example of a partial image in the case where the person A is selected from the summary screen shown in FIG. 5 by the feature point selection input unit 104. The partial image clipper 105 is configured to determine clipping areas such that the position of the feature point is nearly uniform over a plurality of partial images. In the example shown in FIG. 6, a partial image is clipped containing the peripheral area surrounding the person A. However, it should be appreciated that the present invention is not limited to a specific clipping size.

The encoder 106 corresponds to the image codec processor 19, and encodes partial images clipped by the partial image clipper 105. In the present embodiment, MPEG encoding methods are implemented, wherein a predetermined number of pictures is grouped into a single GOP, and encoding is then carried out on a per-GOP basis (as described earlier).

The recording unit 107 corresponds to the media controller 22, and conducts processing to record partial images encoded by the encoder 106 to an HDD or similar recording medium 26.

Figure 7:
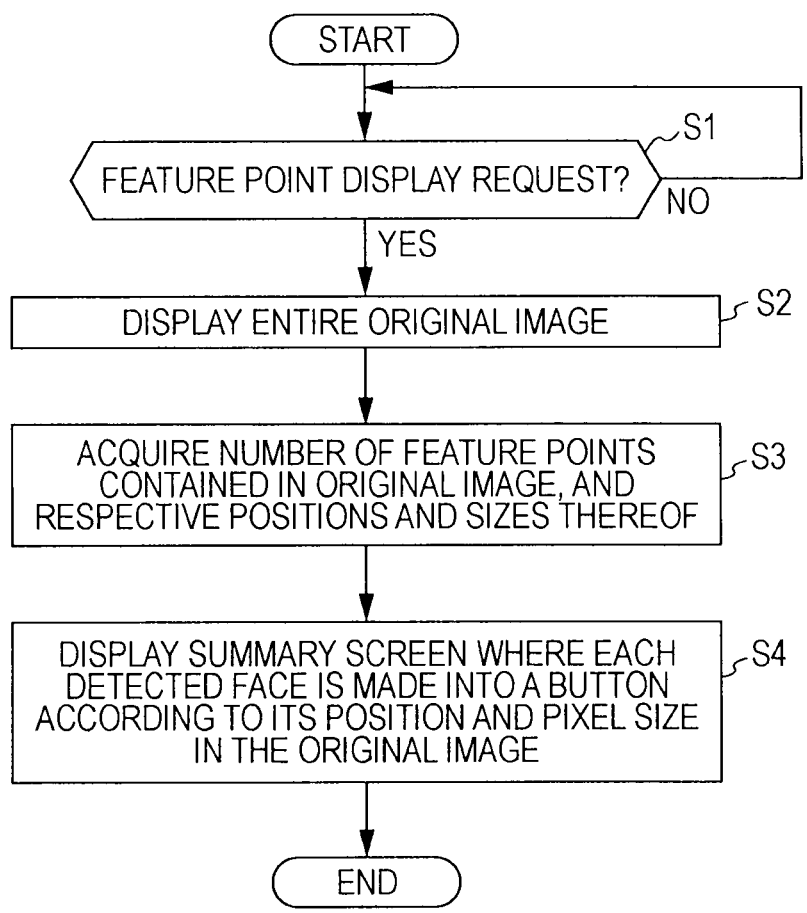
FIG. 7 is a flowchart illustrating a processing sequence for conducting original image display and feature point display.

FIG. 7 is a flowchart illustrating a processing sequence for conducting original image display and feature point display.

When a feature point display request is issued by means of touch panel operations performed on the monitor display 25, the entire image acquisition area (i.e., the original image) is first displayed (step S2).

In addition, the feature point detector 102 is activated, and the number of feature points (i.e., the number of persons' faces) contained in the original image is acquired, together with the position and pixel size of each face in the original image (step S3).

Subsequently, the feature point summary presentation unit 103 outputs a summary screen for display (see FIG. 5), wherein each detected face is made into a button in accordance with the respective positions and pixel sizes acquired in the preceding step S2 (step S4).

Figure 8:
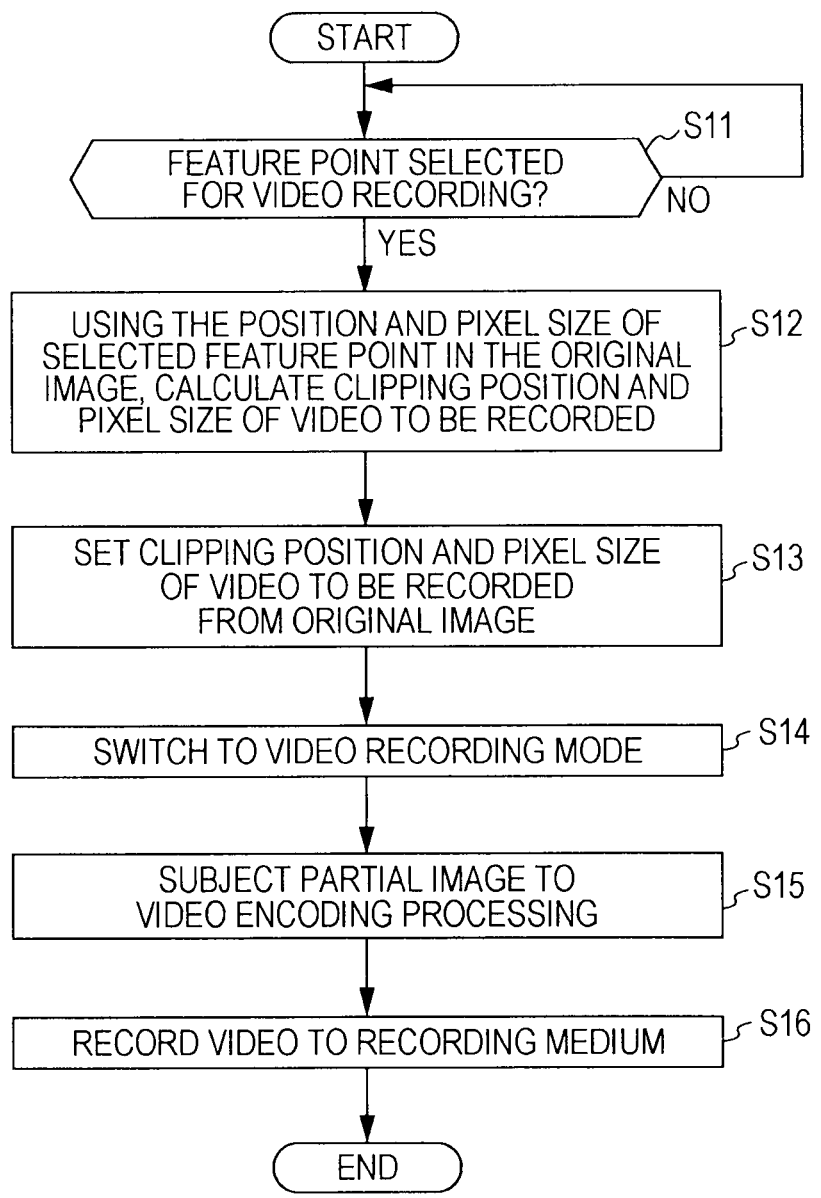
FIG. 8 is a flowchart illustrating a processing sequence for conducting video recording of partial images.

FIG. 8 is a flowchart illustrating a processing sequence for conducting video recording of partial images.

Via the feature point selection input unit 104, the user selects a feature point (i.e., a person) within the original image that the user wants to record (step S11).

In response to the feature point selection operation in the preceding step S11, the partial image clipper 105 calculates the clipping position and pixel size of the area to be recorded from the position and pixel size of the selected feature point in the original image (step S12). Subsequently, the clipping position and pixel size of the area to be recorded from the original image supplied by the original image input unit 101 is configured as a video recording setting (step S13).

Subsequently, the operational mode in the camera DSP 16 is switched to the video recording mode (step S14).

The encoder 106 then performs video encoding of partial images supplied from the partial image clipper 105 (step S15). In the present embodiment, MPEG encoding methods are implemented, wherein a predetermined number of pictures is grouped into a single GOP, and encoding is then carried out on a per-GOP basis.

Next, the recording unit 107 sequentially records the video encoded on a per-GOP basis to the recording medium 26 (step S16).

If the feature point is a person or other animal, then tracking processing may be conducted in order to keep the feature point at a specific position within the original image.

Figure 9:
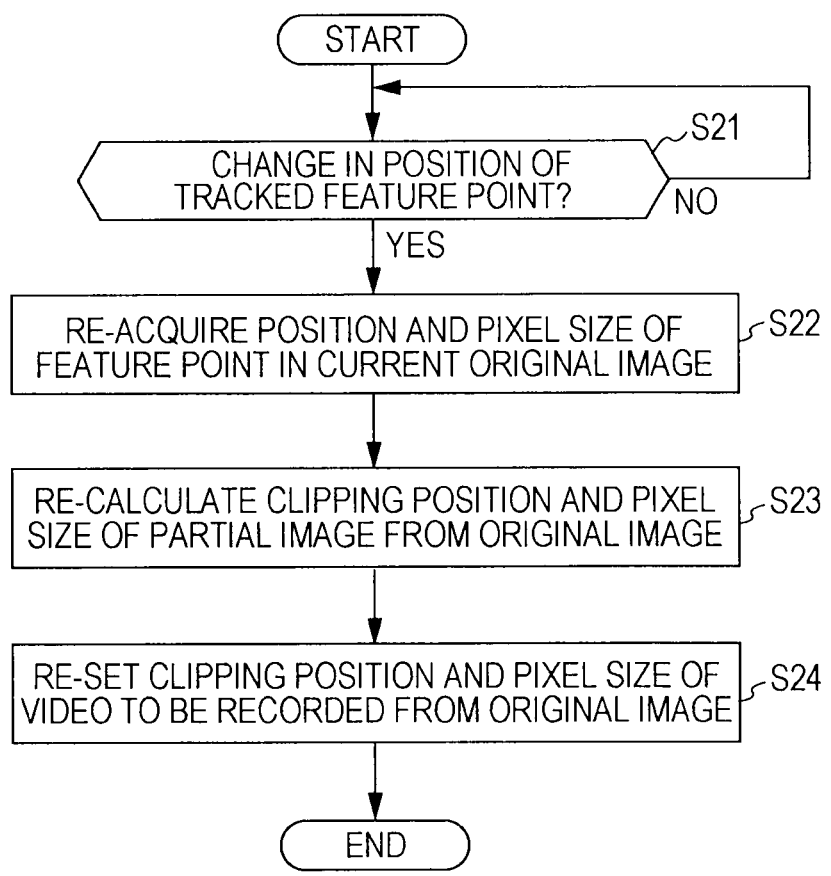
FIG. 9 is a flowchart illustrating a processing sequence executed when the feature point moves during video recording.

FIG. 9 is a flowchart illustrating a processing sequence executed when the feature point moves during video recording.

During video recording, if it is detected that the position has changed for the feature point set as the tracking target (step S21), then the feature point detector 102 reacquires the current position and pixel size of the feature point (i.e., the person's face) within the original image (step S22).

Next, the partial image clipper 105 recalculates the position and pixel size of the partial image to be clipped from the original image (step S23).

The partial image clipper 105 then reconfigures the clipping position of pixel size of the area to be recorded from the original image supplied by the original image input unit 101 (step S24).

Although the user (i.e., the camera operator) is able to specify a feature point (i.e., a person to record) from the summary screen (see FIG. 5) displayed on the monitor display 25 wherein each detected face is made into a button, the user is also able to specify another feature point via the same summary screen even during video recording. For this reason, the user is able to change the feature point (i.e., the person) to be recorded as video.

If an MPEG encoding method is implemented as the video encoding method, then a predetermined number of pictures is grouped into a single GOP, and encoding is performed on a per-GOP basis (as described earlier). In such cases, the positions and sizes of the partial images within a given GOP are not changed, even when a command to change the feature point is issued during that GOP. In other words, video recording of the next feature point is not immediately commenced.

Figure 10:
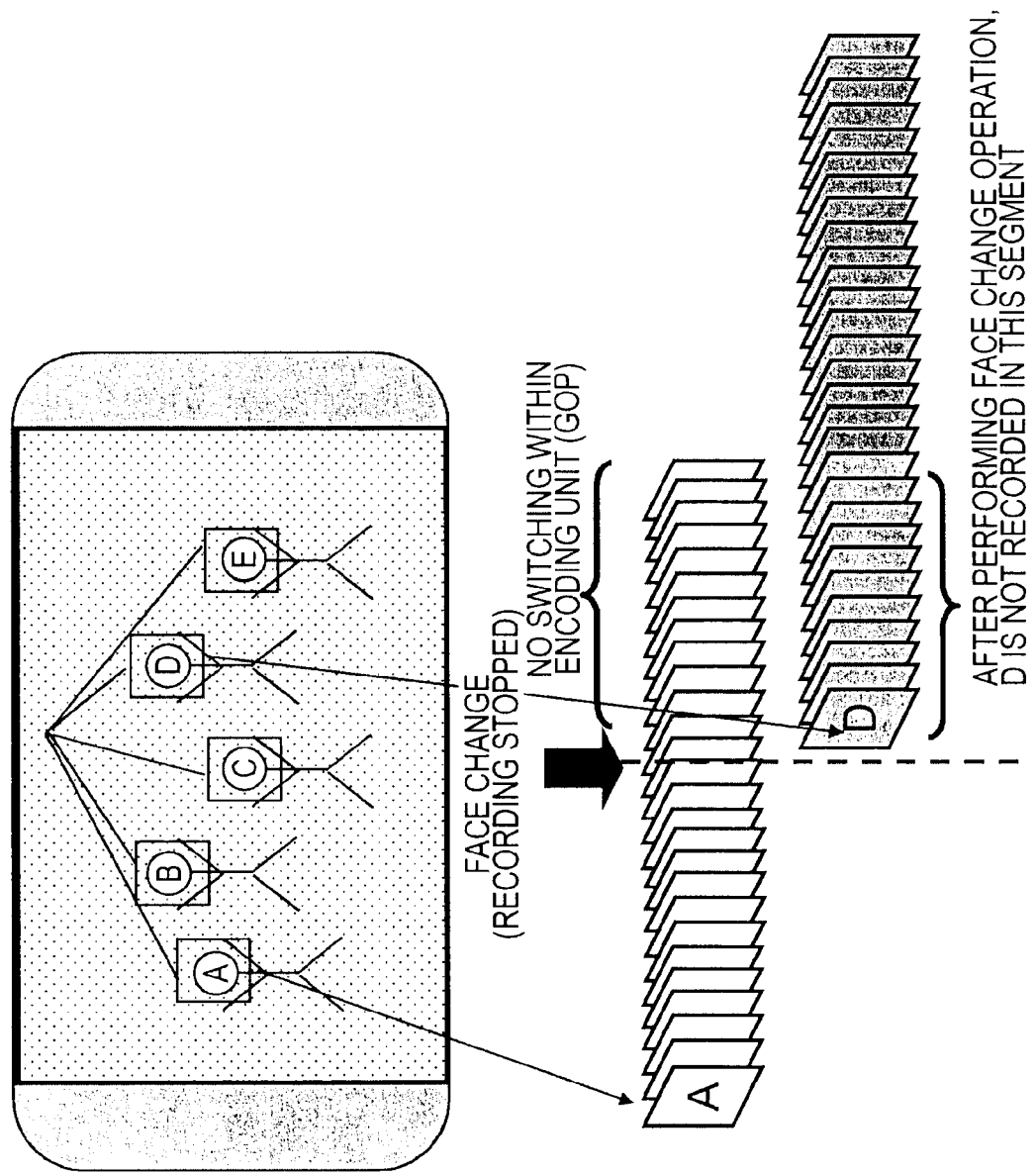
FIG. 10 is a diagram for explaining the processing sequence at the time of changing the feature point set as the subject for video recording.

Consequently, in the present embodiment, when the video recording subject is switched from a person A to a person D, for example, video recording of the partial images for the person D is not commenced until the encoding of the current GOP is finished. The present embodiment is configured such that, once encoding has finished for the last GOP of the person A, video recording of partial images for the person D is resumed (see FIG. 10).

In such cases, video recording can be momentarily paused and then resumed for the changed feature point, without editing the video after recording.

Alternatively, in the present embodiment, when the video recording subject is switched from a person A to a person D, for example, video recording of the partial images for the person D is not commenced until the encoding of the current GOP is finished. Instead, the partial images are buffered. Subsequently, once encoding has finished for the last GOP of the person A, the partial images are read from a buffer, and video recording is resumed for the partial images of the person D, starting from the time that the command to switch persons was issued (see FIG. 11).

In such cases, video recording is not paused at the time that the feature point used for video recording is changed. Instead, video recording of the changed feature point can be resumed as a new chapter or file, and without editing the video after recording. (Herein, a chapter refers to the smallest unit of editing as seen by the user. For example, entry marks indicating playback segments may be inserted into the video stream, with chapters being the playback segments between such entry marks.)

Figure 11:
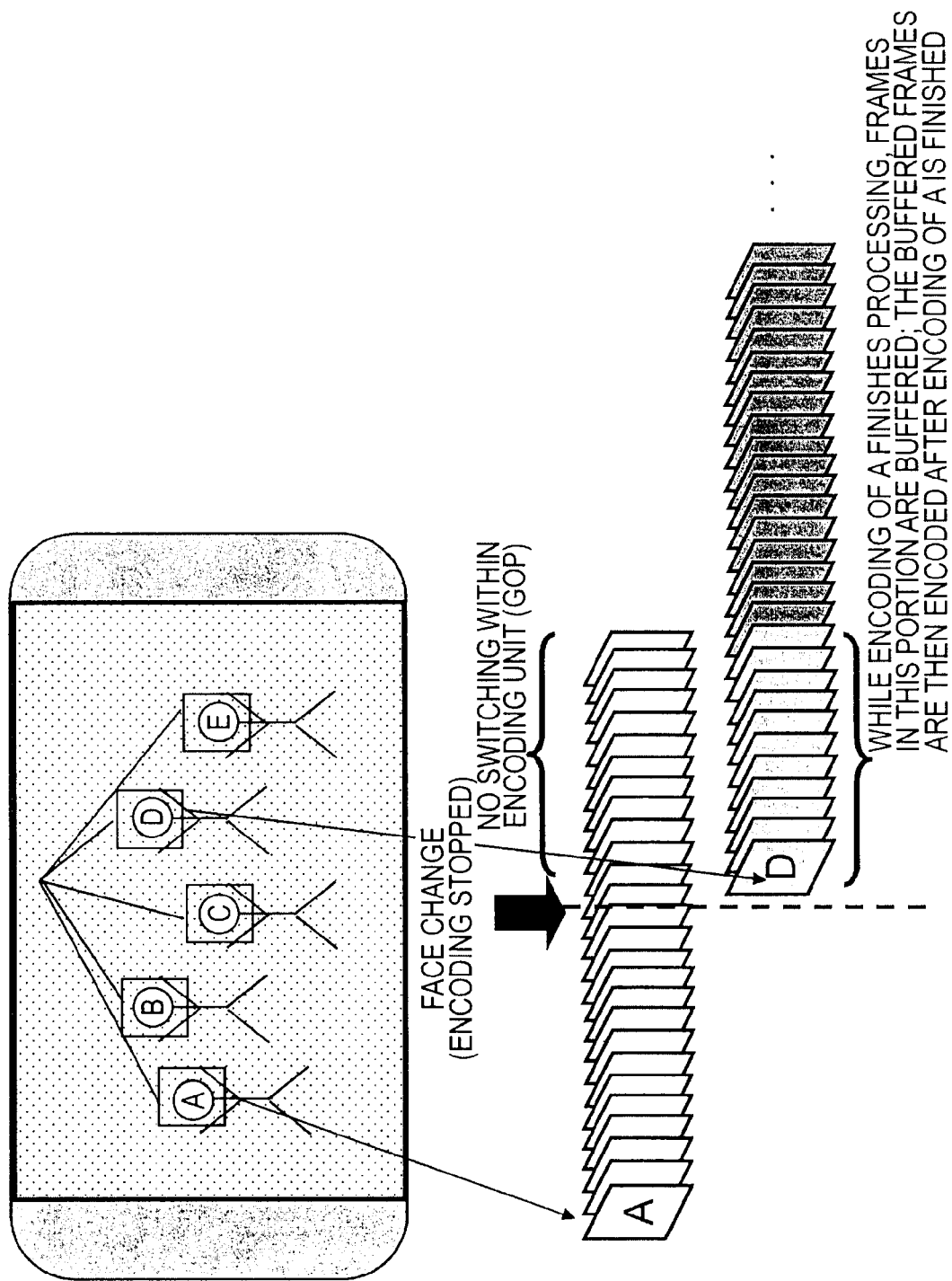
FIG. 11 is a diagram for explaining the processing sequence at the time of changing the feature point set as the subject for video recording.
Figure 12:
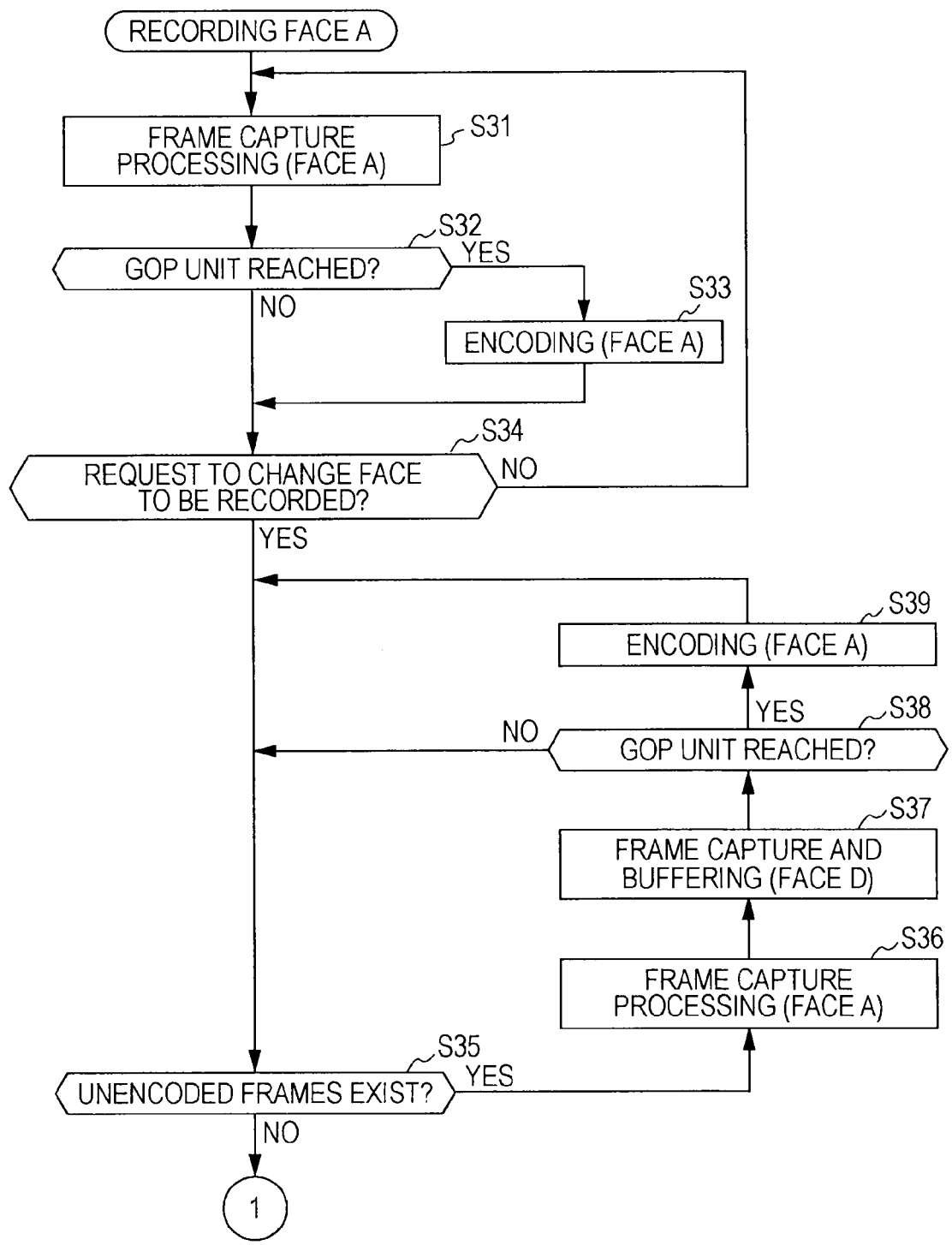
FIG. 12 is a flowchart illustrating the processing sequence at the time of changing the feature point set as the subject for video recording.
Figure 13:
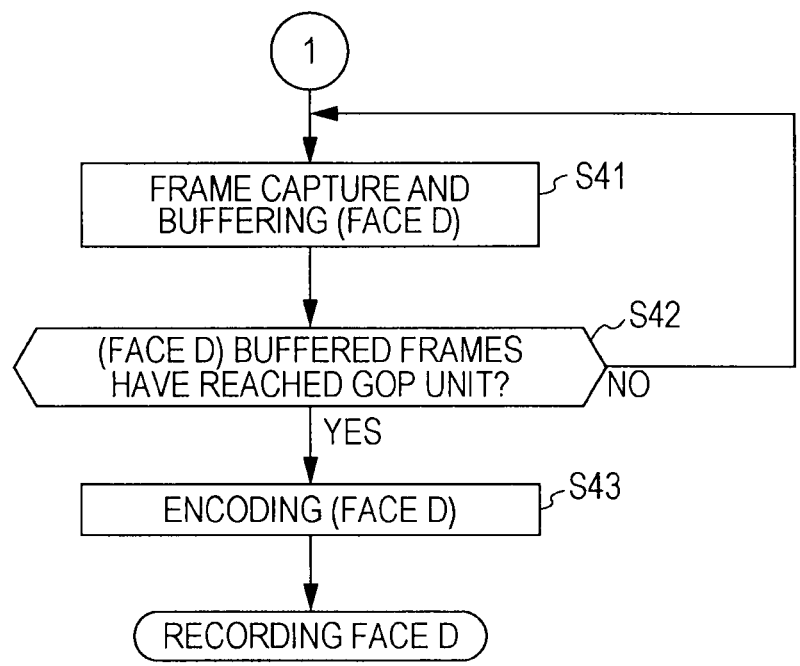
FIG. 13 is a flowchart illustrating the processing sequence at the time of changing the feature point set as the subject for video recording.

FIGS. 12 and 13 are flowcharts illustrating processing sequences executed when the feature point set as the subject for video recording is changed from a person A to a person D. However, as shown in FIG. 11, video recording operation is not paused when the feature point used for video recording is changed. In the present example, video recording of the changed feature point is instead resumed as a new chapter or file.

FIG. 12 illustrates a processing sequence whereby frame-captured partial image frames for the changed feature point are buffered until the encoding of the GOP for the previous feature point is finished.

Following the current selection setting, the partial image clipper 105 first clips a partial image related to the person A from the original image, and conducts frame capture processing (step S31).

Subsequently, each time the number of captured frames reaches the predetermined number for a GOP (step S32), the encoder 106 performs MPEG encoding (step S33).

At this point, a request to change the feature point set as the video recording subject from the person A to the person D is input from the feature point selection input unit 104 via the feature point summary presentation unit 103 (step S34; Yes). A check is then performed to determine whether or not there exist unencoded frames of partial images that have been frame captured. In other words, a check is performed to determine whether or not the encoding of a GOP is still underway (step S35).

If GOP encoding has finished (step S35; Yes), then the process is terminated, and the sequence transitions to the video recording process for partial images related to the person D.

On the other hand, if GOP encoding is still underway (step S35; No), then the partial image clipper 105 clips a partial image related to the person A from the original image, and continues frame capture processing (step S36). In addition, the partial image clipper 105 conducts parallel processing to clip a partial image related to the person D from the original image and conduct frame capturing. The captured frames related to the person D are buffered (step S36).

When the number of captured frames reaches the predetermined number for a GOP (step S38; Yes), the encoder 106 performs MPEG encoding (step S39), and the recording unit 107 then records the encoded images to the recording medium 26. Subsequently, the process is terminated, and the sequence transitions to the video recording process for the partial images related to the person D.

FIG. 13 illustrates a processing sequence for commencing operation to record buffered frames for the changed feature point once the encoding of the GOP for the previous feature point is finished.

The partial image clipper 105 clips a partial image related to the person D from the original image, conducts frame capture processing, and then buffers the captured frame (step S41).

Next, a check is performed to determine whether or not the number of buffered frames has reached the predetermined number for a GOP (step S42).

At this point, if the number of buffered frames has not yet reached the predetermined number for a GOP (step S42; No), then the process returns to step S41, wherein the partial image clipper 105 continues to clip partial images related to the person D from original images, conduct frame capture processing, and then buffer the captured frames.

In contrast, if the number of buffered frames has reached the predetermined number for a GOP (step S42; Yes), then the encoder 106 reads the frames from the buffer and performs MPEG encoding (step 43), while the recording unit 107 records the encoded images to the recording medium 26.

Subsequently, once the recording process for the buffered capture frames has finished, a processing sequence similar to that shown in FIG. 12 may be initiated.

The present application contains subject matter related to that disclosed in Japanese Priority Patent Application JP 2008-186764 filed in the Japan Patent Office on Jul. 18, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A video recording apparatus, comprising:
an imaging unit configured to acquire an original image by imaging at a resolution higher than a pixel count used for video recording;
a feature point detector configured to detect one or more feature points from the original image;
a partial image clipper configured to clip, from the original image, a partial image containing a selected feature point;
a feature point changer configured to change the selected feature point to be clipped as a partial image;
an encoder configured to encode the partial image clipped by the partial image clipper; and
a recording unit configured to record the encoded partial image on a recording medium,
wherein the one or more feature points are highlighted on the original still image for selection, and selection of the selected feature point is made in response to user input,
the encoder encodes in encoding units having a predetermined number of pictures,
when the selected feature point to be clipped as a partial image is switched from a first feature point to a second feature point by the feature point changer, partial images related to the second feature point are buffered until the encoder finishes encoding an encoding unit that was in progress at the time of the switching, and
once the encoding of the encoding unit that was in progress at the time of the switching is finished, encoding of the buffered partial images related to the second feature point is commenced.

2. The video recording apparatus according to claim 1, wherein the partial image clipper determines clipping areas such that a position of the selected feature point is uniform over a plurality of partial images.

3. The video recording apparatus according to claim 1, further comprising:
a feature point presentation unit configured to present the one or more feature points detected by the feature point detector, and then receive a feature point selection operation or a selection switching operation;
wherein
the partial image clipper clips a partial image containing the selected feature point from among the one or more feature point candidates presented.

4. The video recording apparatus according to claim 1, wherein the partial image is encoded in an MPEG format.

5. The video recording apparatus according to claim 1, further comprising:
a display to display at least the original still image and the highlighting of the feature points; and
a touch sensor to receive the user input.

6. A video recording method, comprising:
acquiring an original image imaged at a resolution higher than a pixel count used for video recording;
detecting one or more feature points from the original image;
clipping, from the original image, a partial image containing a selected feature point;
changing the selected feature point to be clipped as a partial image;
encoding the partial image clipped in the partial image clipping step; and
recording the encoded partial image on a recording medium,
wherein the one or more feature points are highlighted on the original still image for selection, and selection of the selected feature point is made in response to user input,
the partial image clipped in the partial image clipping step is encoded in encoding units having a predetermined number of pictures,
when the selected feature point to be clipped as a partial image is switched from a first feature point to a second feature point, partial images related to the second feature point are buffered until encoding of an encoding unit that was in progress at the time of the switching is finished, and
once the encoding of the encoding unit that was in progress at the time of the switching is finished, encoding of the buffered partial images related to the second feature point is commenced.

7. A non-transitory computer-readable medium storing computer-readable instructions thereon that, when executed by a computer, cause the computer to perform a method comprising:
acquiring an original image imaged at a resolution higher than a pixel count used for video recording;
detecting one or more feature points from the original image acquired by imaging;
clipping, from the original image, a partial image containing a selected feature point;
changing the selected feature point to be clipped as a partial image;
encoding the partial image clipped; and
recording the encoded partial image on a recording medium,
wherein the one or more feature points are highlighted on the original still image for selection, and selection of the selected feature point is made in response to user input,
the partial image clipped in the partial image clipping step is encoded in encoding units having a predetermined number of pictures,
when the selected feature point to be clipped as a partial image is switched from a first feature point to a second feature point, partial images related to the second feature point are buffered until encoding of an encoding unit that was in progress at the time of the switching is finished, and once the encoding of the encoding unit that was in progress at the time of the switching is finished, encoding of the buffered partial images related to the second feature point is commenced.

* * * * *